United States Patent
Pirolli et al.

(10) Patent No.: US 6,671,711 B1
(45) Date of Patent: Dec. 30, 2003

(54) SYSTEM AND METHOD FOR PREDICTING WEB USER FLOW BY DETERMINING ASSOCIATION STRENGTH OF HYPERMEDIA LINKS

(75) Inventors: Peter L. Pirolli, San Francisco, CA (US); Ed H. Chi, Palo Alto, CA (US); James E. Pitkow, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/540,976

(22) Filed: Mar. 31, 2000

(51) Int. Cl.[7] .................................................. G06F 9/00
(52) U.S. Cl. ...................... 709/200; 715/501; 715/513; 709/219; 709/223; 707/2; 707/3; 707/4
(58) Field of Search ......................... 715/513; 707/501, 707/501.1, 513; 709/200

(56) References Cited

U.S. PATENT DOCUMENTS

| | | | |
|---|---|---|---|
| 5,835,905 A | 11/1998 | Pirolli et al. .................... | 707/3 |
| 5,875,446 A * | 2/1999 | Brown et al. ................... | 707/3 |
| 6,223,188 B1 * | 4/2001 | Albers et al. ............. | 715/501.1 |
| 6,285,999 B1 * | 9/2001 | Page ............................. | 707/5 |
| 6,327,590 B1 * | 12/2001 | Chidlovskii et al. ........... | 707/5 |

FOREIGN PATENT DOCUMENTS

EP    0 947 936 A2    10/1999

OTHER PUBLICATIONS

S. Card et al., "Automatic Analysis, Theme Generation, and Summarization of Machine–Readable Texts", in Readings in Information Visualization, Morgan Kaufman, Los Altos, California, 1999.

E. Chi et al., An Operator Interaction Framework for Visualization Systems, *Proceedings of the IEEE Information Visualization Symposium*, 1998, pp. 63–70.

E. Chi et al., Visualizing the Evolution of Web Ecologies, CHI '98, *Proceedings of the Conference on Human Factors in Computing Systems*, Los Angeles, California, Apr. 18–23, 1998, pp. 400–407.

(List continued on next page.)

*Primary Examiner*—Ayaz Sheikh
*Assistant Examiner*—Syed A. Zia

(57) ABSTRACT

The present invention also provides a system and method for predicting user traffic flow in a collection of hypermedia documents by determining the association strength of the hypermedia links. Hypermedia links are identified among a plurality of documents, where the documents include content items such as keywords that may or may not be relevant to a user information need. The distribution of the content items in the document collection is then determined. An information item is received as input, and is compared to the content items. In response to the comparison, association strengths are assigned to the hypermedia links. A network flow model uses the association strengths of the hypermedia links to predict user traffic flow in response to an initial condition.

19 Claims, 7 Drawing Sheets

OTHER PUBLICATIONS

G.W. Furnas, Effective View Navigation, *Proceedings of the Human Factors in Computing Systems*, CHI '97, Atlanta, Georgia, 1997, pp. 367–374.

P. Pirolli, Computational Models of Information Scent–Following in a Very large Browsable Text Collection, *Proceedings of the Conference on Human Factors in Computing Systems, CHI '97*, Atlanta, Georgia, 1997, pp. 3–10.

P. Pirolli et al., Information Foraging, *Psychological Review*, (in press).

P. Pirolli et al., Silk from a Sow's Ear: Extracting Usable Structures from the Web, *Proceedings of the Conference of Human Factors in Computing Systems, CHI 96*, Vancouver, British Columbia, Canada, Apr. 13–18, 1996, pp. 118–125.

P. Pirolli et al., Distributions of Surfer's Paths Through the World Wide Web: Empirical Characterizations, *World Wide Web 1*, 1999, pp. 1–17.

J. Pitkow et al., Life, Death, and Lawfulness on the Electric Frontier, *Proceedings of the Conference on Human Factors in Computing Systems, CHI 97*, Atlanta, Georgia, Mar. 22–27, 1997, pp. 383–390.

J. Pitkow et al., Mining Longest Repeated Subsequences to Predict World Wide Web Surfing, *Proceedings of the USENIX Conference on Internet*, 1999 (in press).

J.M. Spool et al., Measuring Website Usability, *Proceedings of the Conference on Human Factors in Computing Systems, CHI '98*, Los Angeles, California, 1998, p. 390.

Frei et al., The Use of Semantic Links in Hypertext Information Retrieval, *Information Processing & Management*, vol. 31, No. 1, pp 1–13, 1995.

\* cited by examiner $T = $
| 0 | 1 | 0 | 0 | 0 | 0 | 0 |
|---|---|---|---|---|---|---|
| 0 | 0 | 1 | 1 | 0 | 1 | 0 |
| 0 | 0 | 0 | 1 | 0 | 0 | 0 |
| 0 | 0 | 0 | 0 | 0 | 0 | 0 |
| 0 | 0 | 0 | 0 | 0 | 1 | 1 |
| 0 | 1 | 0 | 0 | 0 | 0 | 1 |
| 0 | 0 | 0 | 0 | 0 | 1 | 0 |
FIG. 6A
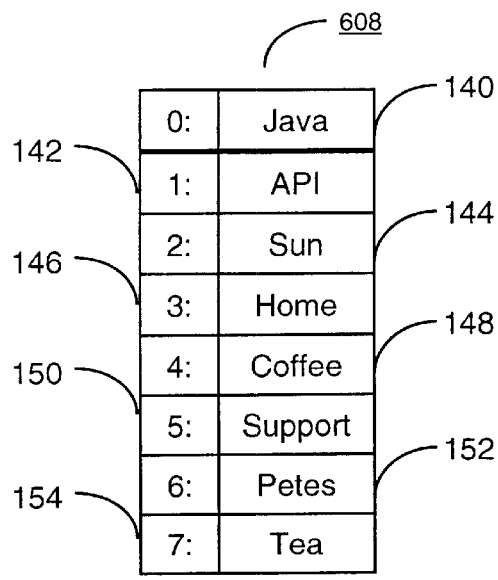
FIG. 6B
$W = $
| 0 | 1 | 1 | 1 | 0 | 1 | 0 |
|---|---|---|---|---|---|---|
| 0 | 0 | 0 | 1 | 0 | 0 | 0 |
| 1 | 0 | 0 | 0 | 0 | 0 | 0 |
| 1 | 1 | 0 | 0 | 0 | 0 | 0 |
| 0 | 0 | 0 | 0 | 0 | 1 | 0 |
| 0 | 0 | 1 | 0 | 0 | 0 | 0 |
| 0 | 0 | 0 | 0 | 1 | 0 | 0 |
| 0 | 0 | 0 | 0 | 0 | 0 | 1 |
FIG. 6C
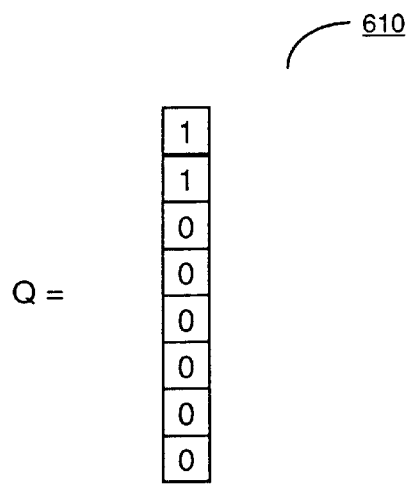
FIG. 6D $$T^T_i = \begin{array}{|c|} \hline 0 \\ \hline 0 \\ \hline 1 \\ \hline 1 \\ \hline 0 \\ \hline 1 \\ \hline 0 \\ \hline \end{array}$$ 702

FIG. 7A $$S_i = \frac{X}{\Sigma X} = \begin{array}{|c|} \hline 0 \\ \hline 0 \\ \hline 0.212 \\ \hline 0.576 \\ \hline 0 \\ \hline 0 \\ \hline 0 \\ \hline 0 \\ \hline \end{array}$$ 704

FIG. 7B $$S = \begin{array}{|c|c|c|c|c|c|c|} \hline 0 & 0 & 0 & 0 & 0 & 0 & 0 \\ \hline 1 & 0 & 0 & 0 & 0 & 0.731 & 0 \\ \hline 0 & 0.212 & 0 & 0 & 0 & 0 & 0 \\ \hline 0 & 0.576 & 1 & 0 & 0 & 0 & 0 \\ \hline 0 & 0 & 0 & 0 & 0 & 0 & 0 \\ \hline 0 & 0.212 & 0 & 0 & 0 & 0 & 0 \\ \hline 0 & 1 & 0 & 0.731 & 0 & 0 & 1 \\ \hline 0 & 1 & 0 & 0.269 & 0 & 0.269 & 0 \\ \hline \end{array}$$ 706

FIG. 7C $$A(2) = S\, A(1) = \begin{array}{|c|} \hline 0 \\ \hline 0 \\ \hline 0.212 \\ \hline 0.576 \\ \hline 0 \\ \hline 0.212 \\ \hline 1 \\ \hline 1 \\ \hline \end{array}$$ 708

FIG. 7D

SYSTEM AND METHOD FOR PREDICTING WEB USER FLOW BY DETERMINING ASSOCIATION STRENGTH OF HYPERMEDIA LINKS

CROSS-REFERENCES TO RELATED APPLICATIONS

The present application is related to commonly assigned U.S. patent application Ser. No. 09/540,063, entitled "System and Method For Inferring User Information Need based on a User Path", which was filed concurrently with the present application.

FIELD OF THE INVENTION

The present invention relates to the field of analysis and design of hypermedia linked collections of documents, and in particular to the prediction of user traffic flow in such a collection without relying on observed usage information.

BACKGROUND

The users of hypertext linked documents such as the World Wide Web, typically forage for information by navigating from document to document by selecting hypertext links. A piece of information such as a snippet of text is typically associated with each hypertext link. The snippet of text provides the user with information about the content of the document at the other end of the link. When the link leads the user to a document that is relevant to his information need, the user comes closer to satisfying his information need, thus reducing the amount of time that he will continue to forage for information. However, if the link leads the user to a document that is not relevant, then the user will continue foraging for information.

The structural linkage topology of collections of hypermedia linked documents is similar to a highway system. In a highway system, a traveler begins at some origin point and travels along the roads of the highway system in order to reach a desired destination. Along the way, the traveler may see signs that indicate which roads he should take to reach his desired destination. For example, a traveler who wishes to go from his home to the local airport might travel along the roadways until seeing a sign with the words "international airport" or a sign with a picture of an airplane. Either sign could give traveler information about which highway ramp to take in order to reach the airport. If the signs do not exist or if they are confusing, the traveler would probably not be able to find his destination.

Similarly, a user on the Web might start from one web page and select links based on whether they look like they might lead the user to another web page that might satisfy his information need. The links are analogous to roadways that can take the user to his destination, the information need. How well these links will lead users to their desired destinations depends on a complex interaction of user goals, user behaviors, and Web site designs.

Designers and researchers who want to know how users will interact with the Web develop hypotheses about these complex interactions. In order to evaluate these hypotheses rapidly and efficiently, tools need to be created to deal with the complexity of these interactions. Existing approaches to evaluate these hypotheses include extracting information from usage data such as Web log files, and applying metrics such as the number of unique users, the number of page visits, reading times, session links, and user paths. The degree of reliability of these approaches varies widely based upon the different heuristics used. For example, most existing Web log file analysis programs provide little insight into user Web interactions because they merely provide simple descriptive statistics on where users have been.

One shortcoming of existing approaches is that they require collecting past user behavior in order to perform the prediction. Another shortcoming of existing approaches is that they do not analyze the content contained in the hyperlinked documents. Thus, there is a need for a system and method for predicting user traffic flow in a collection of hypermedia linked documents that does not require collecting user interaction information in order to perform the prediction, and which also takes into account the content of the documents.

SUMMARY OF THE INVENTION

An embodiment of the present invention provides a system and method for predicting user traffic flow in a collection of hypermedia documents by determining the association strength of hypermedia links. Conceptually, the association strength is a measure of the probability that a user will flow down a particular hypermedia link. The system and method of the present invention do not require collecting user interaction information in order to perform the prediction, because they take into account the content of the documents. An embodiment of the present invention includes a system and method for determining the association strength of hypermedia links in a document collection based on the user information need and content items that are contained in the documents. The system identifies the hypermedia linkage structure among the plurality of documents in the collection, where the documents include content items that may be relevant to a user information need. The system determines the distribution of the content items in the document collection. The system receives an information item as input and compares the information item to the content items. In response to the comparison, the system assigns an association strength to the hypermedia links. The system also uses a network flow model that predicts user traffic flow using the association strengths of the hypermedia links and applying them to an initial condition.

BRIEF DESCRIPTION OF THE DRAWINGS

FIG. 6 illustrates exemplary matrices that are used in an embodiment of the present invention.

FIG. 7 illustrates exemplary matrices that are used in an embodiment of the present invention.

DETAILED DESCRIPTION

The present invention provides a system and method for predicting user traffic flow in a collection of hypermedia documents by determining the association strength of the hypermedia links. The system does not require collecting user interaction information in order to perform the prediction because it performs an analysis of the document contents and how they relate to a user information need item that is input to the system.

Structure of a Hypermedia Linked Document Collection

Figure 1:
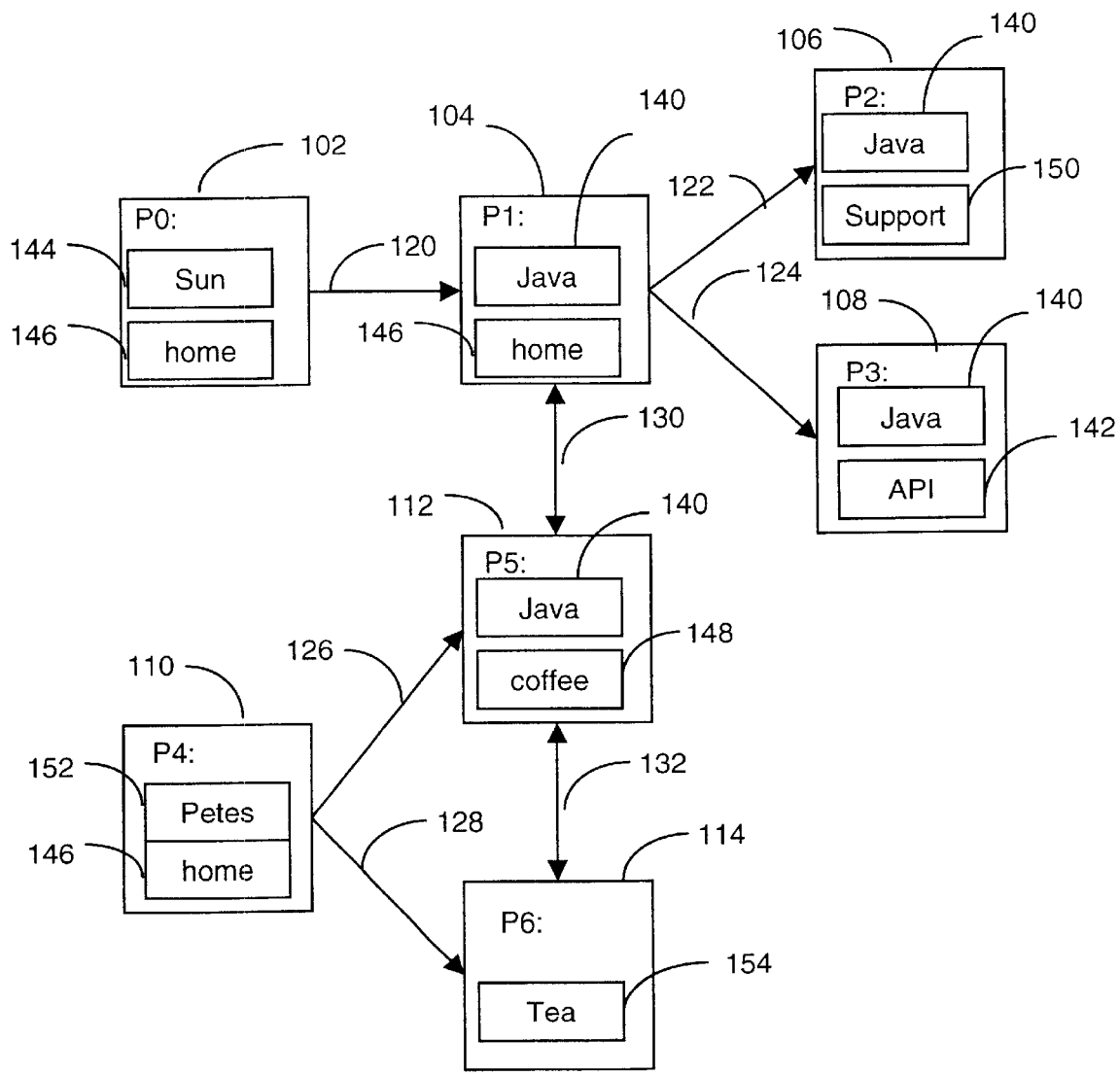
FIG. 1 is a block diagram illustrating the structural linkage and content of a collection of hypermedia linked documents.

FIG. 1 is a block diagram 100 illustrating the structural linkage and content of a collection of hypermedia linked documents. Documents P0, P1, P2, P3, P4, P5 and P6, are indexed and shown as 102, 104, 106, 108, 110, 112 and 114. Documents P0–P6 are linked as shown by hypermedia links 120, 122, 124, 126, 128, 130 and 132. The hypermedia links may be any type of linked from one document to another, including hypertext links. An example of the kind of document shown in P0–P6 (102–114) is a web site. Content items 144–154 are located in documents P0–P6 as shown. The content of documents associated with these hypermedia links is usually presented to the user by some proximal cue such as a snippet of text or a graphic. Web users that are foraging for information use these proximal cues to process the distal content of the document at the other end of the link. The association strength of these hypermedia links, also referred to as "information scent", is the imperfect, subjective, perception of the value, cost, or access path of information sources obtained from proximal cues such as Web links or icons representing the content sources. Conceptually, the association strength is a measure of the probability that a user will flow down a particular hypermedia link.

Determining the Association Strength of Links

Figure 2:
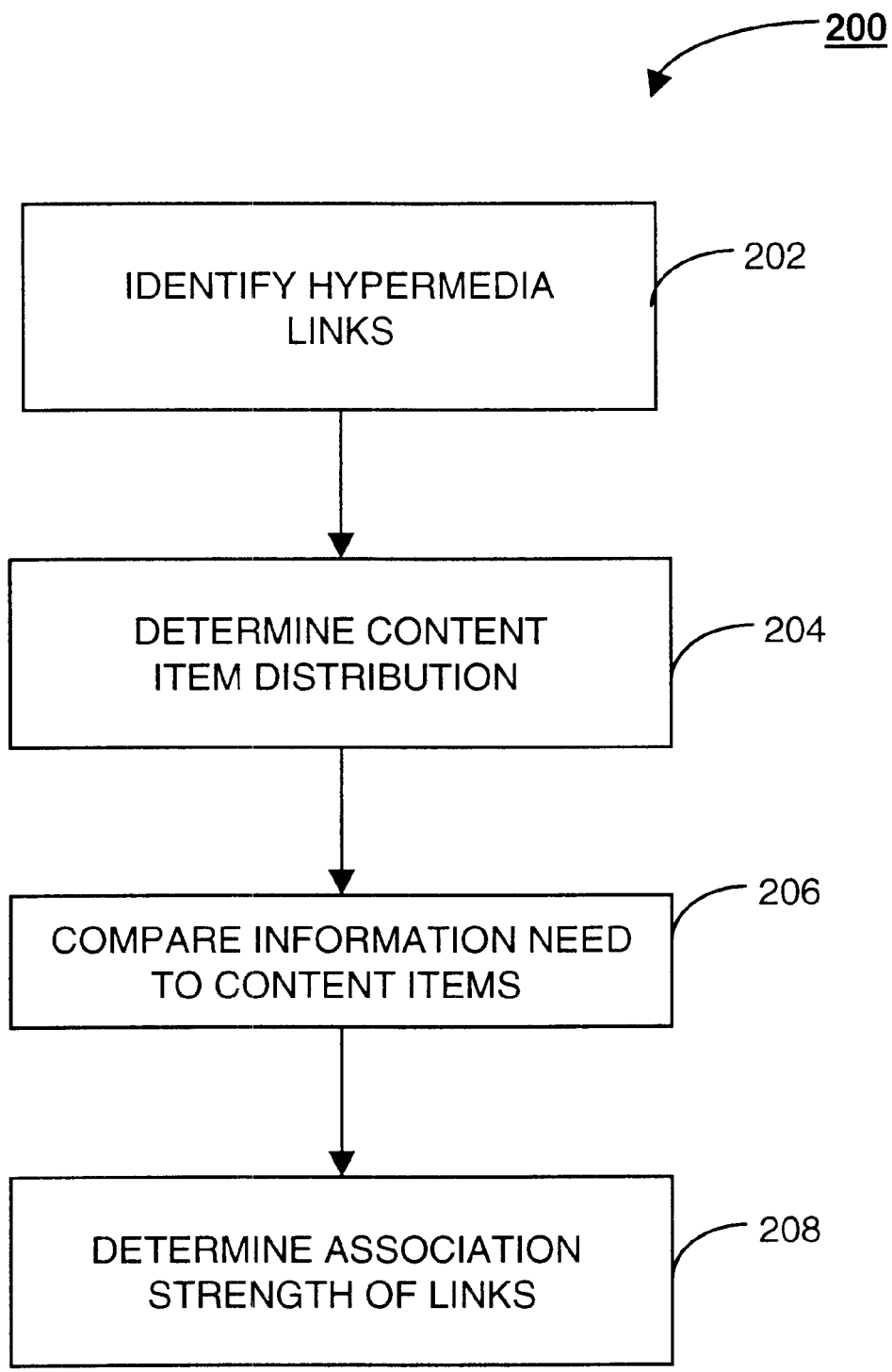
FIG. 2 is a flowchart illustrating steps that are performed in a method for determining the association strength of hypermedia links in an embodiment of the present invention.

FIG. 2 is a flowchart 200 illustrating steps that are performed in a method for determining the association strength of hypermedia links in an embodiment of the present invention. First, the hypermedia links 120–132 of a plurality of documents P0–P6 (102–114) are identified, step 202.

Once the hypermedia links have been identified, the distribution of the content items in the document collection is determined, step 204. The distribution of the content items may be determined by standard information retrieval techniques such as TF.IDF to weight the content items by a frequency in the document collection, as discussed in "Foundations of Statistical Natural Language Processing", C. Manning and H. Schuetze, 1999, MIT Press, p. 542, which is incorporated by reference herein. A variety of other weighting schemes may also be used.

An information need item is compared to the content items in the document collection, step 206. The information need item represents the information that the user wishes to find in the document collection. This information need item may be expressed as a query containing a list of keywords that are relevant to the user's information need. The list of keywords may be expanded to include synonyms or related words.

The result of the comparison between the information need and the content items is used in conjunction with the content item distribution to determine the association strength of the hypermedia links, step 208.

Figure 3:
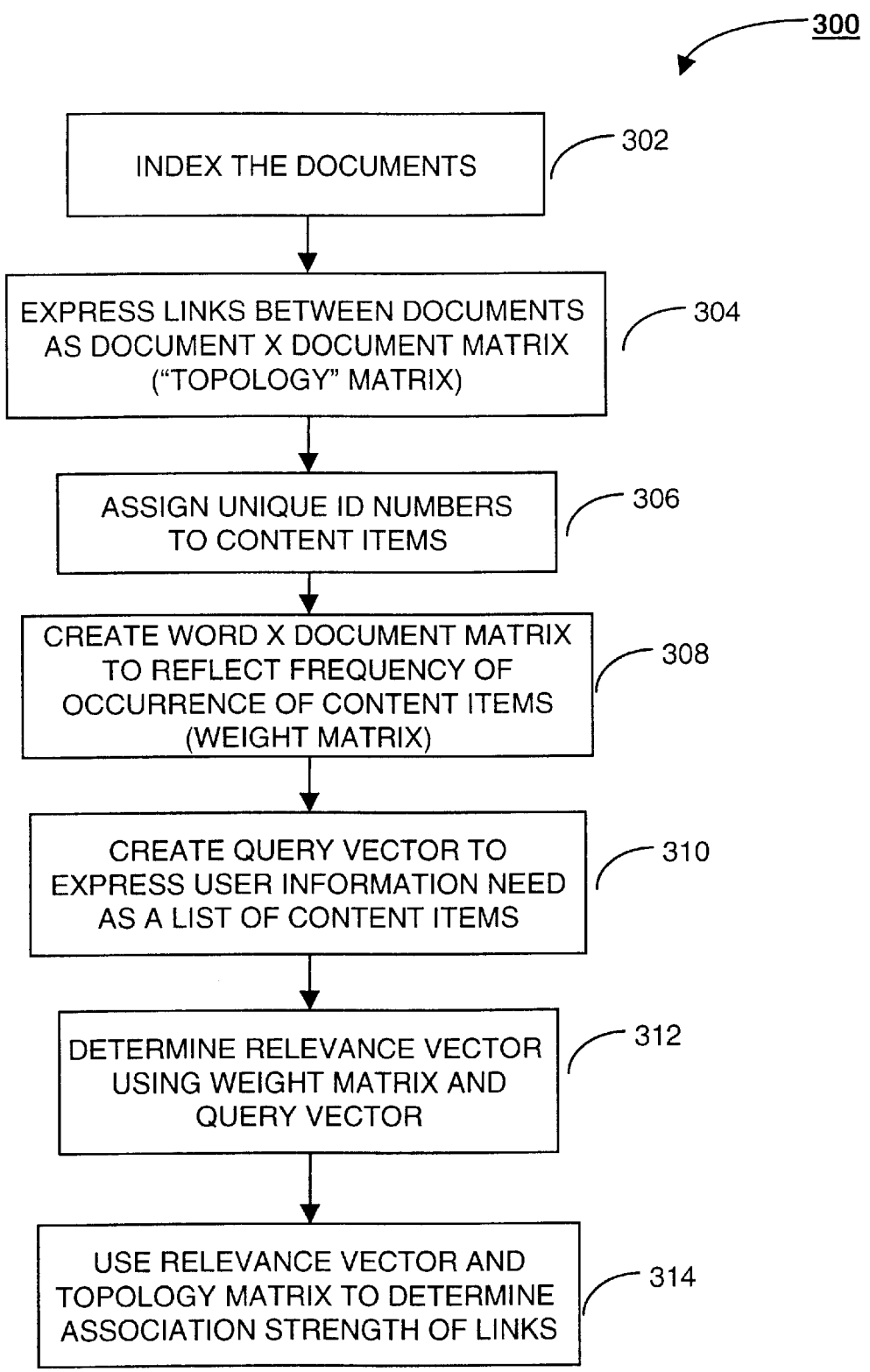
FIG. 3 is a flowchart illustrating steps that are performed in a method for determining the association strength of hypermedia links in an embodiment of the present invention.

FIG. 3 is a flowchart 300 describing the steps of the method described in FIG. 2 in more detail. First, the documents in the collection are indexed, step 302. For example, the seven documents shown in FIG. 1 are indexed as documents P0–P6. The hypermedia links between documents in the collection are then identified, step 304. The hypermedia link and document information forms a graph that can be expressed as a (document x document) adjacency matrix which represents the topology of the hypermedia linked document collection. An example of such a topology matrix T is shown in FIG. 6A. The rows and columns of T are indexed by document IDs 0–6, and a "1" is represents that an outlink exists from one document to another. For example, the "1" located in the first row, second column, indicates that there is an outlink 120 from document P0 102 to document P1 104. Similarly, other values of "1" in the topology matrix T 602 also indicate outlinks.

The unique content items in the documents are indexed, step 302, as shown in FIG. 6B. For example, in FIG. 1, there are eight unique items: "Java" 140 (contained in documents P1, P2, P3 and P5), "API" 142 (contained in document P3), "Sun" 144 (contained in document P0), "Home" 146 (contained in documents P0 and P4), "coffee" 148 (contained in document P5), "support" 150 (contained in document P2), "Petes" 152 (contained in document P4) and "Tea" 154 (contained in document P6). These eight content items are indexed as follows: 0: Java, 1: API, 2: Sun, 3: Home, 4: Coffee, 5: Support, 6: Petes and 7: Tea. These indexed items are shown in FIG. 6B, along with their associated unique content item numbers.

Using the unique content item index numbers, a word x document matrix W is created to reflect the frequency of occurrence of the content items, step 308. Matrix 606 shown in FIG. 6C is an example of such a matrix. Matrix 606 reflects the content item distribution in the collection of documents P0–P6 and is also referred to as the weight matrix W. For example, row 1 of matrix 606 indicates that the word "Java" appears in documents P1, P2, P3, and P5 by the placement of "1" values in columns 2, 3, 4 and 6. The distribution of the content items may be determined by standard information retrieval techniques such as TF.IDF to weight the content items by a frequency in the document collection, cited above in connection with the discussion of FIG. 2 above. A variety of other weighting schemes may also be used.

A query vector is created to express the user information need as a list of content items, step 310. An example of a query vector 610 is shown in FIG. 6D. The nth component of the query vector 610 corresponds to the nth indexed word. For example, query vector 610 has values of "1" in the first to rows to represent the words "Java" and "API", which are the two items in the set of keywords representing the information need. The list of keywords that may be used to express an information need may be expanded to include synonyms or related words.

The query vector Q 610 is multiplied with the weight matrix W 606 in order to obtain a list of documents that roughly corresponds to the user information need, step 312, according the following equation:

$$R = W^T Q \qquad \text{Equation 1:}$$

The list of documents P0–P6 is expressed as a relevance vector R. The values contained in the relevance vector show which document is considered to be the most relevant. For example, using the query vector Q 610 and weight matrix W 606, the resulting relevance $R^T = [0\ 1\ 1\ 2\ 0\ 1\ 0]$. In this example, where there are seven documents, P0–P6, the fourth document (corresponding to P3) is the most relevant because it has a relevance value of 2, which is higher than the other values. The relevance vector R is multiplied by the topology matrix T 602 in order to determine the association strength of each of the links connecting the documents in the collection, step 314.

In the current example, the association strength is determined as follows. The exponent of the items in the relevance vector R is taken for practical and theoretical reasons such as Luce's Choice Theorem. Note that this is not necessary if the TF.IDF weighting scheme was used earlier. The result is the relevance vector $R^T=[1\ 2.718\ 2.718\ 7.389\ 1\ 2.718\ 1]$. This relevance vector R is applied to each row $T_i$ of the topology matrix. Each row $T_i$ of the topology matrix corresponds to one document and specifies the links out from the document. In other words, the hypermedia links out from a node are represented by the rows of the topology matrix T. The outlinks for the document P1 are extracted by transposing T and taking the first column 702, shown in FIG. 7A as $T^T_i$. An element Tij from this row multiplied with the corresponding element Ri in the relevant vector gives the association strength or "scent" Sij. Taking each row of T and multiplying its element by element with the relevance vector R results in an association strength vector $Si^*$. For example, if out link vector $T^T_i$ is multiplied element-wise by relevance vector R, the result is the relevance of documents that are linked to P1:

$$X = T^T_i R\ X^T = [0\ 0\ 2.718\ 7.389\ 0\ 2.718\ 0] \quad \text{Equation 2:}$$

The association strengths may be proportionalized so that the all links sum to one. The reason for proportionalizing the association strengths is that the amount of users flowing through a link should stay constant. The association strength of each of the outlinks, for example, $S_i$ 704 as shown in FIG. 7B, should be proportional to the sum of the association strength from all of the outlinks. The full document x document association strength matrix S 706 may be generated by repeating the above calculation for every document and outlinks.

The resulting association strength matrix S 706 may then be used to simulate users flowing down different links any hypermedia links document collection. Association strength matrix S 706 specifies a network of association strengths associated with each hypermedia link, and indicate the amount of user interest flowing down each link.

Predicting Traffic Flow Using Association Strengths

Figure 4:
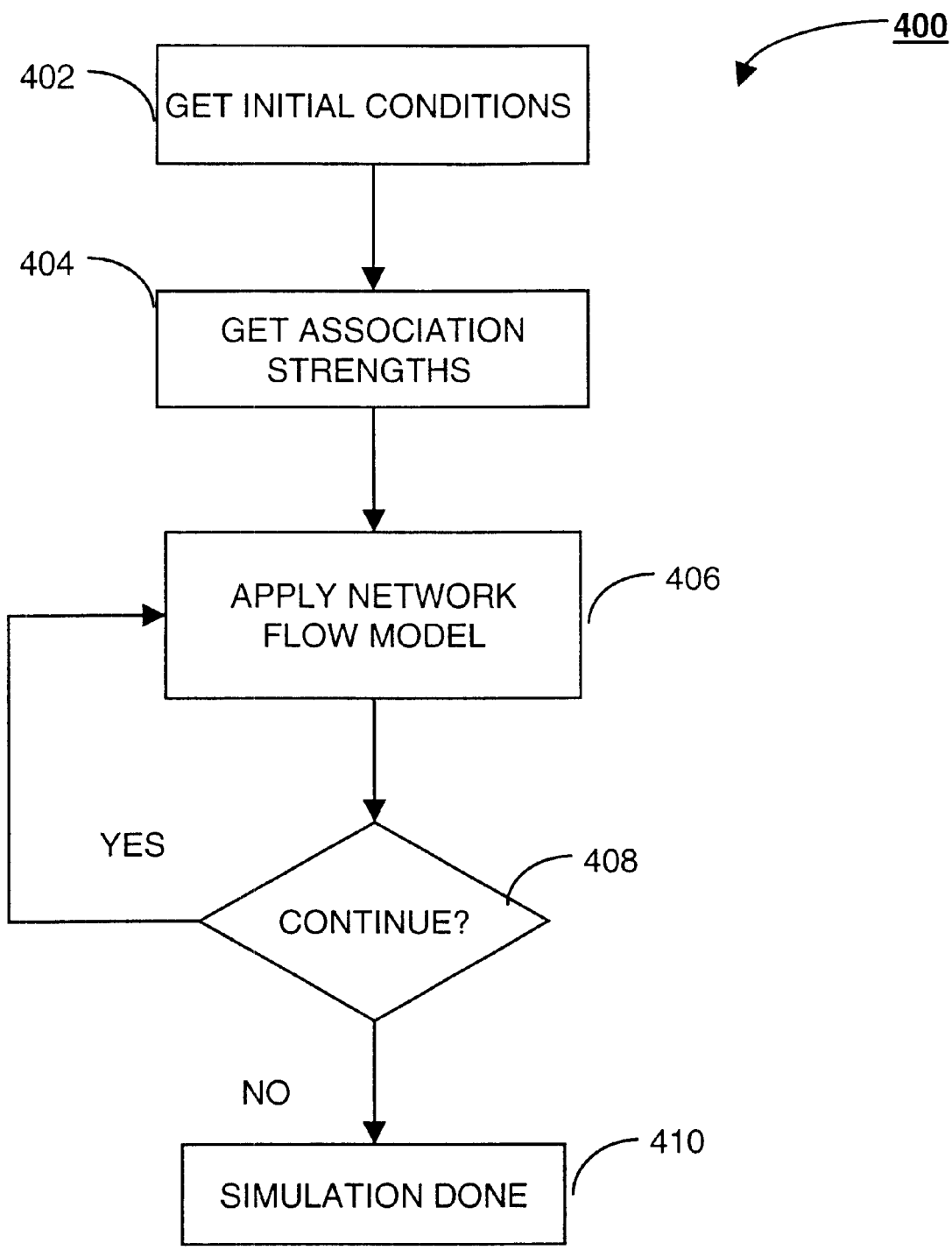
FIG. 4 is a flowchart illustrating steps that are performed in a method for predicting traffic flow in an embodiment of the present invention.

Once the association strength of the hypermedia links are determined, the may be used in a method for predicting traffic flow. A method for predicting traffic flow according to an embodiment of the present invention is shown in flowchart 400 of FIG. 4. The initial conditions that will be used in the method are determined, step 402. Typically the initial conditions specified an entry point such as a document, or web page, from which a user will begin to select links to satisfy his information need. These initial conditions may include a plurality of users starting from the same four different entry points. The initial condition may be represented as an entry vector E. For example, an entry vector $E=[0\ 1\ 0\ 0\ 0\ 0\ 0]$ specifies that the initial condition is the document P1. The association strengths for the hypermedia links are obtained, step 404. A network flow model is then applied, step 406, to the initial conditions using the association strengths. Any traditional network flow model may be used in step 406. A spreading activation algorithm may be used, for example as discussed in "System for Predicting Documents Relevant to Focus Documents by Spreading Activation Through Network Representations of a Linked Collection of Documents", U.S. Pat. No. 5,835,905 by Pirolli, et al., which is incorporated by reference herein.

Applying the spreading activation algorithm to an initial condition, for example, entry vector E results in $A(1)=E^T=[0\ 1\ 0\ 0\ 0\ 0\ 0]$. A(1) may be pumped through the association strength matrix S 706 to obtain A(2) 708 as shown in FIG. 7D.

After the network flow model is applied, step 406, a determination is made as to whether to continue the simulation, step 408. This determination may be based on a number of factors, including a predetermined number of steps, a proportion of users who continue to select hypermedia links, or the total number users is compared to a predetermined threshold. The proportion of users who continue to select hypermedia links may be determined by the function $\alpha(L)$, which is also known as "the law of surfing", as described in P. Pirolli and J. E. Pitkow, "Distributions of surfers' paths through the World Wide Web: Empirical characterization", 1999, World Wide Web (2): pp. 29–45 and Huberman, B. A., P. Pirolli, J. Pitkow, R. Lukose, "Strong regularities in World Wide Web surfing", 1999, Science 280: pp. 95–97, which are incorporated by reference herein. For example, the spreading activation may go through a number of iterations t=1. . . n, according to the equation $A(t)=\alpha S\ A(t-1)$.

If the determination in the step 408 indicates that the simulation should continue, then processing continues for another iteration at step 406. Otherwise, the simulation is complete and ends at step 410. In the spreading activation example described above, the result of the simulation is $A(n)=S\ A(n-1)$.

Figure 5:
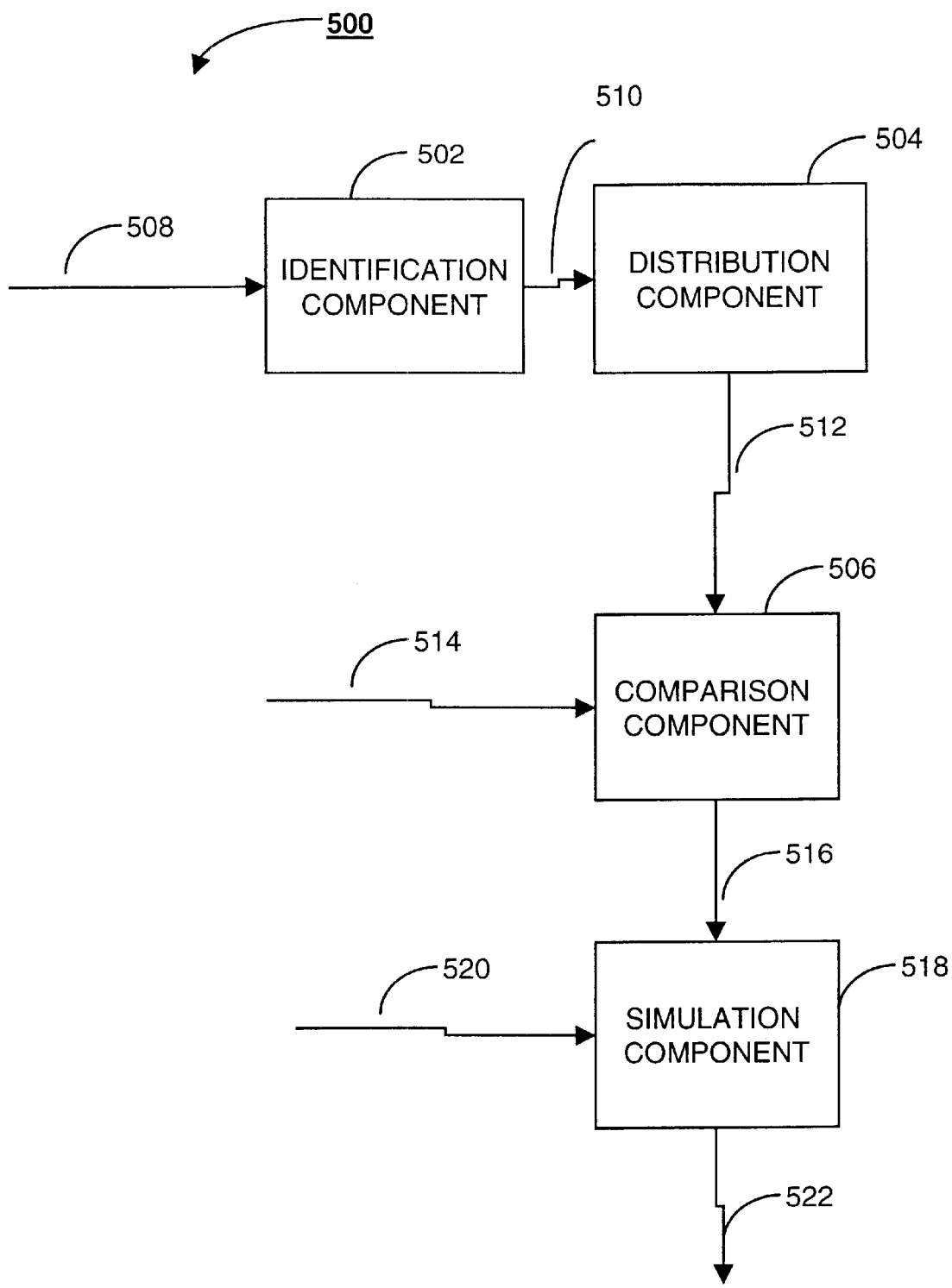
FIG. 5 is a block diagram illustrating a system for predicting user traffic flow in an embodiment of the present invention.

A system for determining the association strength of hypermedia links in an embodiment of the present invention, is shown by the block diagram 500 of FIG. 5. The system includes an identification component 502. Identification component 502 responds to a hypermedia linked document collection input 508, and identifies the hypermedia links of a plurality of documents. Identification component 502 may be used to perform methods steps 202 in FIG. 2 and step 304 in FIG. 3. The identified links 510 are acted upon by distribution component 504 to determine the distribution of the content items in the documents, resulting in a set of weighted content items 512. Distribution component 504 may be used to perform method steps 204 and 308. Weighted content items 512 are then compared to an information need item 514 by a comparison component 506, to produce association strength 516 associated with the hypermedia links. Comparison component 506 may be used to perform method steps 206 and steps 312–314. The documents include a plurality of content items as described above. Association strength 516 may be used in a system for stimulating user traffic flow.

A system for simulating traffic flow in a plurality of hypermedia linked documents in an embodiment of the present invention includes a simulation component 518 which responds to an association strength input 516 and an initial condition 520 to produce a predicted user path 522. The simulation component 518 may be used to perform method steps 406–410. The simulation component 518 applies a network flow model to the initial condition wherein the network flow model simulates traffic flow in response to a plurality of association strengths 516 representative of information need 514. The initial condition represents the entry point or state of one or more users at the start of the simulation. For example, the initial condition may be an entry web page. If multiple users are to be modeled, then the initial condition may be the entry points of a plurality of users.

The network flow model may be any suitable traditional network flow model, for example a spreading activation algorithm as described above. The simulation component may operate in successive iterations and then stop when a particular condition is satisfied. For example, the simulation may continue for a predetermined number of steps or link traversals. The simulation may continue until a proportion of users who continue exceeds, reaches or drops below a desired level, as determined by the function $\alpha(L)$, as described above. Alternatively, the simulation may continue until a total number of users to continue drops below a predetermined threshold $\epsilon$.

It should be appreciated that the description above is merely illustrative, and should not be read to limit the scope of the invention nor the claims hereof.

What is claimed is:

1. A method for determining the association strength of hypermedia links, comprising:
   identifying the hypermedia links of a plurality of documents, wherein the documents include a plurality of content items; determining the distribution of the content items in the documents;
   comparing an information need item to the content items to determine a relevance value for each document; and
   assigning an association strength to the hypermedia links using the relevance value for each document.

2. A method for determining an association strength of hypermedia links, comprising:
   identifying the hypermedia links of a plurality of documents, wherein the documents include a plurality of content items;
   determining the frequency of occurrence of the content items in the documents;
   generating a query representing an information need item in terms of the content items;
   determining a relevance value for each document based on the frequency of the content items in the documents and the query; and
   determining an association strength for the hypermedia links associated with the documents in accordance with the relevance value.

3. A method for predicting user traffic flow, comprising the steps of:
   identifying the hypermedia links of a plurality of documents, wherein the documents include a plurality of content items;
   determining the distribution of the content items in the documents;
   comparing an information need item to the distribution of the content items to generate a relevance value for each document;
   assigning an association strength to the hypermedia links in accordance with the relevance value for each document;
   selecting an initial condition, wherein the initial condition includes at least one document;
   applying the association strength to the initial condition to predict user traffic flow.

4. A method for simulating user traffic flow in a plurality of hypermedia linked documents, comprising the steps of:
   receiving a plurality of association strengths for the links between documents, the association strengths representing an information need and content of the plurality of documents;
   selecting an initial condition, wherein the initial condition represents a starting state in the plurality of documents;
   applying a network flow model to the initial condition, wherein the network flow model uses the association strengths to simulate traffic flow.

5. The method of claim 4, wherein the network flow model is a spreading activation algorithm.

6. The method of claim 4, wherein the association strengths are determined using a TF.IDF weighting scheme.

7. The method of claim 4, wherein the simulation continues for a predetermined number of steps.

8. The method of claim 4, wherein the proportion of users who continue is determined by the function $\alpha(L)$.

9. The method of claim 4, wherein the total number of users who continue drops below a predetermined threshold $\epsilon$.

10. The method of claim 4, wherein the initial condition is an entry web page.

11. A system for determining the association strength of hypermedia links, comprising:
    an identification component for identifying the hypermedia links of a plurality of documents, wherein the documents include a plurality of content items;
    a distribution component for determining the distribution of the content items in the documents;
    a comparison component for comparing an information need item to the content items to determine a relevance value of each document; and
    an association strength component for assigning an association strength to hypermedia links in response to relevance values from the comparison component.

12. A system for determining an association strength of hypermedia links, comprising:
    an identification component for identifying the hypermedia links of a plurality of documents, wherein the documents include a plurality of content items;
    a frequency component for determining the frequency of occurrence of the content items in the documents;
    a comparison component for comparing an information need item to the content items to generate a query;
    a relevance component for determining a relevance value for each document based on the frequency of the content item in the documents and the query; and
    an association strength component for determining an association strength for the hypermedia links associated with the documents in accordance with a relevance value.

13. A system for simulating user traffic flow in a plurality of hypermedia linked documents, comprising:
    a selection component for selecting an initial condition, wherein the initial condition represents a starting state in the plurality of documents;
    an identification component for identifying the hypermedia links of the documents, wherein the documents include a plurality of content items;
    a frequency component for determining the frequency of occurrence of the content items in the documents;
    a comparison component for comparing an information need item to the content items to generate a query;

a relevance component for determining a relevance value for each document based on the frequency of the content item in the documents and the query;

an association strength component for determining an association strength for the hypermedia links associated with the documents in accordance with a relevance value; and a simulation component for applying a network flow model to the initial condition, wherein the network flow model simulates traffic flow in response to the association strengths representative of an information need and the content items of the documents.

14. The system of claim 13, wherein the network flow model is a spreading activation algorithm.

15. The system of claim 13, wherein the association strengths are determined using a TF.IDF weighting scheme.

16. The system of claim 13, wherein the simulation component operates for a predetermined number of steps.

17. The system of claim 13, wherein the proportion of users who continue is determined by the function $\alpha(L)$.

18. The system of claim 13, wherein the total number of users who continue drops below a predetermined threshold $\epsilon$.

19. The system of claim 13, wherein the initial condition is an entry web page.

* * * * *